United States Patent Office 3,310,591
Patented Mar. 21, 1967

3,310,591
OLIGOMERS OF CONJUGATED DIENES
Ernest A. Zuech and Roy A. Gray, Bartlesville, Okla., assignors to Phillips Petroleum Company, a corporation of Delaware
No Drawing. Filed Dec. 10, 1964, Ser. No. 417,475
7 Claims. (Cl. 260—666)

This invention relates to the oligomerization of conjugated dienes. In one aspect, this invention relates to novel catalysts for the oligomerization of conjugated dienes. In another aspect, it relates to a process for producing novel catalysts for the oligomerization of conjugated dienes. In a still further aspect, the invention relates to a process for the oligomerization of conjugated dienes.

Various processes have been developed for the dimerization and trimerization of conjugated dienes. For example, when 1,3-butadiene is contacted with a catalyst system comprising an organoaluminum such as triethylaluminum and a reducible metal halide such as titanium tetrachloride, good yields of 1,5,9-cyclododecatriene can be obtained. Other processes have been developed for converting butadiene to dimers, including both vinylcyclohexene and 1,5-cyclooctadiene. Since these cyclic dimers and trimers are useful as intermediates for the production of a wide variety of compounds, processes for the production of these dimers in good yields have considerable potential value. For example, cyclooctadiene can be hydrogenated to cyclooctene and cyclooctane which in turn can be oxidized to the corresponding dicarboxylic acid which is useful in the preparation of polyesters and polyamides.

Recently it has been shown that reducible phosphine complexes with metal halides such as nickel chlorides serve, after reduction with an alkali metal or alkaline earth metal reducing agent, as efficient catalysts for the oligomerization of conjugated dienes. While this process has many advantages, particularly with respect to the high yields of dimers and trimers obtained, it must be recognized that the phosphine materials are expensive and the yields, while high, do not approach the very high levels desired for commercial operation.

It is an object of this invention to provide a new catalyst for the production of cyclic dimers and trimers of conjugated dienes. It is a further object of this invention to provide a catalyst and process for the preparation of 1,5-cyclooctadiene.

According to the process of this invention, conjugated dienes are converted to cyclic dimers in good yield by contacting a diene selected from the group consisting of 1,3-butadiene, isoprene and piperylene with the reduction product obtained by admixing (a) a nickel compound, (b) a triaryl phosphite containing a finite amount of at least one material selected from the group consisting of a diaryl phosphite and an aromatic alcohol, and (c) a reducing agent selected from the group consisting of alkali metal hydrides and complex hydrides of alkali metals and Group III metals, said admixing being effected in the presence of a catalyst formation diluent selected from the group consisting of tetrahydrofuran, diglyme (diethylene glycol dimethyl ether), triglyme (triethylene glycol dimethyl ether), and dioxane, said contacting being effected in the presence or absence of an additional inert diluent.

The new and novel catalysts of this invention are formed by mixing the above-defined (a), (b) and (c) components in the presence of the above-defined catalyst formation diluent. Catalyst component (a) comprises a nickel compound, preferably one having a high solubility in the above-defined ethereal diluents, as for example nickel bromide, nickel acetate, nickel propionate, nickel acetylacetonate and the like. The reducing agents (c) which may be employed in forming the diolefin dimerization catalyst of this invention are alkali metal hydrides and complex hydrides of alkali metals and Group IIIa metals. Suitable reducing agents include sodium hydride, lithium hydride, potassium hydride, cesium hydride, rubidium hydride, lithium aluminumhydride, lithium borohydride, sodium borohydride, and the like. Catalyst component (b) as employed herein is a triaryl phosphite which contains a finite amount of a diaryl phosphite and/or a finite amount of an aromatic alcohol (phenol). The amount of diaryl phosphite present in the triaryl phoshpite will range from 5 to 10 percent by weight of the mixture of diaryl and triaryl phosphites, while the amount of aromatic alcohol which can be employed either alone or in combination with the diaryl phosphite will range from 1 to 5 weight percent of the triaryl phosphite-diaryl phosphite-aromatic alcohol mixture.

As used herein, the terms "triaryl phosphite" and "diaryl phosphite" are intended to include phosphite compounds containing aryl or alkaryl groups. These compounds are represented by the formulas $$P(OR)_3 \text{ and } HOP(OR)_2$$

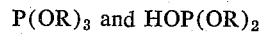

wherein each R is selected from the group consisting of aryl and alkaryl radicals containing from 6 to 10 carbon atoms, inclusive. The aromatic alcohols are represented by the formula ROH wherein R is as defined above. Some examples of triaryl phosphite compounds which can be employed are triphenyl phosphite, tri-p-tolyl phosphite, tri-alpha-naphthyl phosphite, tri-2,4,6-trimethylphenyl phosphite, tri-o-tolyl phosphite, diphenyl p-tolyl phosphite, tri(4-n-butylphenyl) phosphite, tri(2-ethylphenyl) phosphite, and the like. Examples of diaryl phosphite compounds which can be employed are diphenyl phosphite, di-alpha-naphthyl phosphite, di-p-tolyl phosphite, di-3-ethylphenyl phosphite, phenyl p-tolyl phosphite, di(4-sec-butylphenyl) phosphite, p-tolyl naphthyl phosphite, and the like.

Specific examples of aromatic alcohols which can be employed as herein described include, for example, phenol, p-cresol, 2,4-dimethylphenol, 3-ethylphenol, 4-tert-butylphenol, 2,4,6-trimethylphenol, and the like.

In forming the new catalyst composition which is employed for the dimerization of conjugated diolefins according to the process of this invention the catalyst components (a), (b) and (c) are contacted together in the presence of a diluent comprising at least one of tetrahydrofuran, diglyme, triglyme and dioxane. It is preferred to use a charge order in which either the metal hydride reducing agent or the nickel component (a) is charged last. In this manner the nickel component and the reducing agent do not contact each other until all of the components are present for the catalyst formation. In forming the active catalyst, the mol ratio of triaryl phosphite compound, containing at least one of diaryl phosphite or an aromatic alcohol, to nickel component will range from 2/1 to 6/1, while the mol ratio of metal hydride reducing agent to nickel component will range from 2/1 to 10/1. The amount of ether diluent present during the catalyst formation can vary over a wide range but will generally range from 2 to 50 ml. per millimol of nickel present as a nickel compound. The catalyst preparation is carried out at a temperature generally ranging from 50 to 100° C. for a period of time generally ranging from about 0.5 to 10 hours, although longer times can be employed if desired. It is to be understood that the catalyst formation can be carried out separately and then charged to the diene dimerization zone, or it can be formed directly in the dimerization zone prior to contact with the diene to be dimerized. If desired, any solid compounds formed on admixing the catalyst components can be separated from the liquid portion and the latter can be employed as the catalyst. It is also within the scope of this invention, of course, to employ the total reaction mixture as the catalytic agent.

Following the catalyst formation as described above, these new catalysts are employed for the oligomerization of the aforementioned conjugated dienes and are particularly useful for the conversion of 1,3-butadiene to 1,5-cyclooctadiene. The dimerization is carried out by contacting one of the above-listed dienes with the catalyst prepared as described above at a temperature generally ranging from 50 to 180° C. in the presence or absence of an additional dimerization diluent. Additional dimerization diluents which can be employed include the above-described ethers (catalyst formation diluents), as well as such inert diluents as aromatic hydrocarbons, saturated alicyclic hydrocarbons, and unsaturated alicyclic hydrocarbons. Specific examples of such diluents include benzene, toluene, xylene, cyclohexane, cyclooctane, cyclohexene, and the like. The amount of additional diluent will generally range from 0 to 50 ml. per millimol of nickel present in the dimerization zone. The catalyst level employed in the dimerization will generally range from 0.25 to 5 millimols of nickel per 100 grams of conjugated diene to be dimerized.

The dimerization is carried out either batchwise or continuously utilizing a reaction time which can range from a few minutes to several days, but which will generally range from about 10 minutes to about 8 hours.

The new catalysts of this invention are very active, producing high conversions of butadiene and very high selectivities to 1,5-cyclooctadiene. Furthermore, the catalysts of this invention are formed from relatively inexpensive components and it is this combination of high activity and low cost which makes the catalysts of this invention particularly attractive for the conversion of conjugated dienes to cyclic dimers.

The following specific examples clearly illustrate the advantages of the new catalysts of this invention and their activity in converting conjugated dienes to cyclic dimers. However, it is not intended that the invention as described above be limited to the specific features shown in these examples.

*Example 1*

A series of runs was carried out in which butadiene was dimerized to 1,5-cyclooctadiene by means of a catalyst prepared by reaction of a nickel compound, triphenyl phosphite, either containing diaryl phosphite or diaryl phosphite and a phenol, and sodium hydride in the presence of an ether-type diluent.

In each of these runs a nickel compound, a triaryl phosphite, an ether-type diluent and a 50 percent by weight suspension of sodium hydride in mineral oil were charged to a 3-necked, 250 ml. flask equipped with a stirrer and condenser and heated at 65° C. for 4 hours. In each of these runs, the sodium hydride was charged last. At the end of the 4 hours, benzene in the amounts shown in the following table was added to the catalyst after which the resulting solution was filtered, and a portion of the catalyst solution was charged to the catalyst reservoir of the continuous reactor system. The continuous reactor system employed in these runs comprised two positive displacement pumps, one feeding catalyst solution, the other feeding butadiene, with pump discharge lines feeding into a 20-foot long by ⅜-inch outside diameter carbon steel tube mounted so that the reaction mixture could be heated or cooled. The butadiene feed rate to the reactor was controlled by a pressure controller.

The runs were carried out by continuously charging both butadiene and the benzene solution of the catalyst to the reactor, collecting the reactor effluent, stripping off the benzene, and distilling the remaining material to recover vinylcyclohexene, 1,5-cyclooctadiene, and 1,5,9-cyclododecatriene. The reactor effluent in each run was analyzed by gas-liquid chromatography using a 10-foot Silicone on Celite column operating at 150 to 175° C.

In the following Table I, the results of the above-described runs are given. Two of the commercial samples of triphenylphosphite were analyzed by nuclear magnetic resonance. The NMR spectrum of the Eastman triphenylphosphite showed the presence of diphenylphosphite and phenol, whole the spectrum of the sample of Hooker triphenylphosphite showed the presence of little or none of the phenol or diphenylphosphite.

TABLE I

[Catalyst Formation]

| Run No. | Nickel Compound | Grams Nickel Compound | Triphenyl-phosphite Type [1] | Grams Triphenyl-phosphite | Grams NaH Susp. | Grams Added Phenol | Grams Added Diphenyl-phosphite | Conversion, Percent | Catalyst Formation Diluent |
|---|---|---|---|---|---|---|---|---|---|
| 1 | Nickel Acetate | 3.53 | A | 24.8 | 2.9 | 0 | 0 | 35 | Tetrahydrofuran. |
| 2 | do | 3.53 | B | 24.8 | 2.9 | 0 | 0 | 33 | Do. |
| 3 | do | 3.53 | C | 24.8 | 2.9 | See Footnote | | 93 | Do. |
| 4 | do | 3.53 | A | 24.8 | 2.9 | 1.0 | 0 | 63 | Do. |
| 5 | do | 3.53 | A | 24.8 | 2.9 | 0.5 | 0 | 90 | Do. |
| 6 | do | 3.53 | A | 24.8 | 2.9 | 0 | ([2]) | 92 | Do. |
| 7 | do | 3.53 | D | 24.8 | 2.9 | 0 | 2.34 | 96 | Do. |
| 8 | do | 3.53 | B | 24.8 | 2.9 | 0 | 2.34 | 97 | Do. |
| 9 | do | 3.53 | A | 24.8 | 2.9 | 0 | 2.34 | 92 | Do. |
| 10 | Nickel Bromide | 5.44 | D | 24.8 | 2.88 | 0 | 0 | 94 | Triglyme. |
| 11 | do | 5.44 | D | 24.8 | 2.88 | 0 | 0 | 98 | Tetrahydrofuran. |

[Dimerization]

| Run No. | Ml. Diluent | Ml. Added Benzene | Volume Catalyst Soln. Charged, Ml. | Time, Hours | Temp., °C. | Pressure, p.s.i. | Butadiene Fed | Ultimate Yield 1,5-Cyclooctadiene, Percent |
|---|---|---|---|---|---|---|---|---|
| 1 | 40 | 600 | 128 | 4 | 140 | 400 | 430 | 70 |
| 2 | 40 | 600 | 101 | 3 | 140 | 400 | 320 | 72 |
| 3 | 40 | 600 | 122 | 3.5 | 140 | 400 | 375 | 84 |
| 4 | 40 | 600 | 125 | 4 | 140 | 400 | 435 | 81 |
| 5 | 40 | 600 | 133 | 4 | 140 | 400 | 406 | 85 |
| 6 | 40 | 600 | 114 | 3.5 | 140 | 400 | 353 | 85 |
| 7 | 40 | 600 | 110 | 3.5 | 140 | 400 | 380 | 78.7 |
| 8 | 40 | 600 | 103 | 3 | 140 | 400 | 300 | 80.7 |
| 9 | 40 | 600 | 130 | 4 | 140 | 400 | 396 | 80.2 |
| 10 | 39.7 | 600 | 166.5 | 5 | 140 | 400 | 485 | 82.5 |
| 11 | 40 | 600 | 145 | 4 | 140 | 400 | 477 | 80.0 |

[1] A—Commercial (Hooker) triphenylphosphite containing only trace amounts of phenol and/or diphenylphosphite.
B—Commercial (Monsanto) triphenylphosphite containing only trace amounts of phenol and/or diphenylphosphite.
C—Commercial (Eastman) triphenylphosphite containing 5-8 Wt. percent diphenylphosphite and approximately 2 Wt. percent phenol.
D—C which had been distilled to remove phenol.
[2] 1 ml.

The above data (Runs 3–11) clearly indicate that the presence of a triaryl phosphite which contains 5 to 10 weight percent diaryl phosphite and/or 1 to 5 weight percent aromatic alcohol gives substantially higher conversions and ultimate yields of cyclic oligomers of conjugated dienes than similar catalyst systems in which the triphenylphosphite does not contain either of the additives (Runs 1 and 2).

*Example II*

A batch run was carried out in which a catalyst was formed according to the method of this invention and utilized for the dimerization of butadiene.

In this run, a mixture of 5.14 grams (0.02 mol) of nickel acetylacetonate, 1.52 grams (0.04 mol) of sodium borohydride, 24.8 grams (0.08 mol) of triphenylphosphite containing 5 to 8 weight percent diphenylphosphite and 35 ml. of tetrahydrofuran were heated at 65° C. for 4 hours. A dark brown-black material which resulted was transferred to a beverage bottle and amounted to 56.5 grams.

A 14.9 gram aliquot of the above-prepared catalyst mixture was charged to an autoclave along with 129 grams of butadiene. From an initial temperature of 33° C. and an initial pressure of 35 p.s.i.g., the temperature was increased to 145° C. at which temperature the pressure was 170 p.s.i.g., this heating requiring 47 minutes. The heat was turned off, and after another 30 minutes the temperature had dropped to 118° C. and the pressure had fallen to 30 p.s.i.g., at which time the mixture was cooled to 17° C. and charged with an additional 128 grams of butadiene and again heated to 150° C. This latter heating required 19 minutes, and after an additional 28 minutes the pressure had again fallen to 25 p.s.i.g. (125° C.). After cooling, the reaction mixture was removed from the reactor, the low-boiling materials were stripped off, and the product was distilled to yield 236.4 grams of colorless liquid, with a boiling point range of from 70° C. at 100 mm. to 100° C. at 2.0 mm. Also obtained was 15.7 grams of residue. The liquid material analyzed 1.9 weight percent 1,5,9-cyclododecatriene, 86.3 weight percent 1,5-cyclooctadiene, and 11.8 weight percent vinylcyclohexene. It was estimated that 7.8 grams of the 15.7 grams of residue was catalyst, or 7.9 grams of heavy materials was formed during the reaction. Thus, the total weight of product was 236.4 plus 7.9 or 244.3 grams of liquid product, which represents a conversion of 94.8 percent. On this basis, the selectivity to cyclooctadiene was 83.5 percent.

Reasonable variations and modifications of this invention are possible within the scope of the disclosure without departing from the spirit and scope thereof.

We claim:

1. A catalyst system consisting essentially of the reduction product obtained by mixing (a) a nickel compound selected from the group consisting of nickel bromide, nickel acetate, nickel propionate and nickel acetylacetonate, (b) a triaryl phosphite selected from the group consisting of triphenylphosphite, tri-p-tolyl phosphite, tri-alpha-naphthyl phosphite, tri-2,4,6-trimethylphenyl phosphite and tri-o-tolyl phosphite containing from 5 to 10 percent by weight of diaryl phosphite selected from the group consisting of diphenylphosphite, di-alpha-naphthyl phosphite, di-p-tolyl phosphite, di-3-ethylphenyl phosphite, and phenyl-p-tolyl phosphite, (c) a reducing agent selected from the group consisting of sodium hydride, lithium hydride, potassium hydride, cesium hydride, rubidium hydride, lithium aluminum hydride, lithium borohydride and sodium borohydride, and (d) a catalyst forming diluent selected from the group consisting of tetrahydrofuran, diglyme, triglyme and dioxane.

2. A catalyst system consisting essentially of the reduction product obtained by mixing (a) a nickel compound selected from the group consisting of nickel bromide, nickel acetate, nickel propionate and nickel acetylacetonate, (b) a triaryl phosphite selected from the group consisting of triphenylphosphite, tri-p-tolyl phosphite, tri-alpha-naphthyl phosphite, tri-2,4,6-trimethylphenyl phosphite and tri-o-tolyl phosphite containing from 1 to 5 weight percent of an aromatic alcohol selected from the group consisting of phenol, p-cresol, 2,4-dimethylphenol, 3-ethylphenol, 4-tert-butylphenol, and 2,4,6-trimethylphenol, (c) a reducing agent selected from the group consisting of sodium hydride, lithium hydride, potassium hydride, cesium hydride, rubidium hydride, lithium aluminum hydride, lithium borohydride and sodium borohydride, and (d) a catalyst forming diluent selected from the group consisting of tetrahydrofuran, diglyme, triglyme and dioxane.

3. A process for dimerization of a conjugated diene selected from the group consisting of 1,3-butadiene, isoprene and piperylene which comprises contacting same with a catalyst system consisting essentially of the reduction product obtained by mixing (a) a nickel compound selected from the group consisting of nickel bromide, nickel acetate, nickel propionate and nickel acetylacetonate, (b) a triaryl phosphite selected from the group consisting of triphenylphosphite, tri-p-tolyl phosphite, tri-alpha-naphthyl phosphite, tri-2,4,6-trimethylphenyl phosphite and tri-o-tolyl phosphite containing from 5 to 10 percent by weight of diaryl phosphite selected from the group consisting of diphenylphosphite, di-alpha-naphthyl phosphite, di-p-tolyl phosphite, di-3-ethylphenyl phosphite, and phenyl-p-tolyl phosphite, (c) a reducing agent selected from the group consisting of sodium hydride, lithium hydride, potassium hydride, cesium hydride, rubidium hydride, lithium aluminum hydride, lithium borohydride and sodium borohydride, and (d) a catalyst forming diluent selected from the group consisting of tetrahydrofuran, diglyme, triglyme and dioxane.

4. The process of claim 3 wherein the catalyst is present in the amount of 0.25 to 5 millimols of nickel per 100 grams of conjugated diene.

5. A catalyst system consisting essentially of the reduction product obtained by mixing (a) a member selected from the group consisting of salts and chelate complexes of nickel, (b) a triaryl phosphite having mixed therewith a compound of the group consisting of diaryl phosphite in an amount in the range of 5 to 10 percent by weight of the triaryl phosphite and an aromatic alcohol in an amount in the range of 1 to 5 percent by weight of the triaryl phosphite, (c) a reducing agent selected from the group consisting of alkali metal hydrides and complex hydrides of alkali metal and Group III metals and (d) a catalyst forming diluent selected from the group consisting of tetrahydrofuran, diglyme, and dioxane.

6. A process for dimerization of a conjugated diene selected from the group consisting of 1,3-butadiene, isoprene and piperylene which comprises contacting same with a catalyst system consisting essentially of the reduction product obtained by mixing (a) a member selected from the group consisting of salts and chelate complexes of nickel, (b) a triaryl phosphite having mixed therewith a compound of the group consisting of diaryl phosphite in an amount in the range of 5 to 10 percent by weight of the triaryl phosphite and an aromatic alcohol in an amount in the range of 1 to 5 percent by weight of the triaryl phosphite, (c) a reducing agent selected from the group consisting of alkali metal hydrides and complex hydrides of alkali metal and Group III metals and (d) a catalyst forming diluent selected from the group consisting of tetrahydrofuran, diglyme, and dioxane.

7. A process for dimerization of a conjugated diene selected from the group consisting of 1,3-butadiene, isoprene and piperylene which comprises contacting same with a catalyst system consisting essentially of the reduction product obtained by mixing (a) a nickel compound selected from the group consisting of nickel bromide, nickel acetate, nickel propionate and nickel acetylacetonate, (b) a triaryl phosphite selected from the group consisting of triphenylphosphite, tri-p-tolyl phosphite, tri-alpha-naphthyl phosphite, tri-2, 4,6-trimethylphenyl phosphite and tri-o-tolyl phosphite containing from 1 to 5 weight percent of an aromatic alcohol selected from the group consisting of phenol, p-cresol, 2,4-dimethylphenol, 3-ethylphenol, 4-tert-butylphenol and 2,4,6-trimethylphenol.

References Cited by the Examiner
UNITED STATES PATENTS 3,219,716 11/1965 Wittenberg et al. ____ 260—666

DELBERT E. GANTZ, *Primary Examiner.*

V. O'KEEFE, *Assistant Examiner.*